(12) United States Patent
Gardner

(10) Patent No.: US 8,739,284 B1
(45) Date of Patent: May 27, 2014

(54) SYSTEMS AND METHODS FOR BLOCKING AND REMOVING INTERNET-TRAVERSING MALWARE

(75) Inventor: Patrick Gardner, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 508 days.

(21) Appl. No.: 12/683,168

(22) Filed: Jan. 6, 2010

(51) Int. Cl.
*G06F 21/00* (2013.01)
*G06F 21/55* (2013.01)

(52) U.S. Cl.
CPC ..................................... *G06F 21/55* (2013.01)
USPC .......................................................... 726/24

(58) Field of Classification Search
CPC .................................................. G06F 21/55
USPC ................................ 726/17, 24, 26–27
See application file for complete search history.

(56) References Cited

U.S. PATENT DOCUMENTS

| 2009/0222907 A1* | 9/2009 | Guichard | 726/17 |
| 2010/0083378 A1* | 4/2010 | Cheswick | 726/23 |

OTHER PUBLICATIONS

Jeremiah Grossman, Cross-Site Scripting Worms & Viruses, Jun. 2007, A WhiteHat Security Whitepaper, pp. 1-18.*
Ye et al. Intelligent File Scoring System for Malware Detection from the Gray List, Jul. 2009, KDD, pp. 1385-1393.*
Jim et al., Defeating Script Injection Attacks with Browser-Enforced Embedded Policies, May 2007, WWW 2007, pp. 601-610.*
Livshits et al., "Spectator: Detection and Containment of JavaScript Worms", Aug. 2008, USENIX Association, pp. 335-348.*

* cited by examiner

*Primary Examiner* — Hadi Armouche
*Assistant Examiner* — Dao Ho
(74) *Attorney, Agent, or Firm* — ALG Intellectual Property, LLC

(57) ABSTRACT

A computer-implemented method for blocking and removing Internet-traversing malware may include: 1) identifying a persistent storage object of an Internet client application, 2) identifying an attempt by an executable object to access the persistent storage object, 3) determining that the executable object is not authorized to access the persistent storage object, and then 4) performing a security action based on the determination. Various other methods, systems, and computer-readable media are also disclosed.

17 Claims, 5 Drawing Sheets

SYSTEMS AND METHODS FOR BLOCKING AND REMOVING INTERNET-TRAVERSING MALWARE

BACKGROUND

Internet users increasingly use a variety of social networking websites to connect with friends, family, and professional contacts, as well as with communities of people with shared interests, concerns, or beliefs. Many social networking sites benefit users by enabling users to exchange information with others whom they trust or respect. Unfortunately, malware authors may seek to exploit this trust for their own ends.

For example, some malware threats (such as KOOBFACE and SAMY) may, upon infecting a user's machine, harvest session tokens for one or more social networking sites from browser cookies stored on the user's machine. The malware may then use these session tokens to submit malicious or unwanted content to social networking sites under the user's account. For example, the malware may post a fake message under the user's account that urges the user's friends to follow a link that points to a copy of the malware (e.g., an apparently benign software installer that may install the malware on the victim's computer).

Security software may attempt to combat malware of this type by scanning executable files for signatures of the malware (i.e., patterns indicating the presence of malware), both to prevent users from disseminating the malware and to prevent the users' friends from downloading and installing the malware. However, changes to the malware (e.g., via polymorphism) or new threats may prevent security systems from identifying the malware until security system vendors update their signature databases.

SUMMARY

As will be described in greater detail below, the instant disclosure generally relates to systems and methods for blocking and removing Internet-traversing malware by monitoring attempts to access persistent storage objects (such as cookies) and blocking attempts made by unauthorized executable objects to access the persistent storage objects. In one example, one or more of the various systems described herein may accomplish this task by: 1) identifying a persistent storage object of an Internet client application (such as a web browser cookie), 2) identifying an attempt by an executable object to access the persistent storage object, 3) determining that the executable object is not authorized to access the persistent storage object, and then 4) performing a security action based on the determination.

In some examples, the Internet client application may include a web browser and the persistent storage object may include a cookie. In addition, the executable object may include an application, a library (e.g., a dynamic-link library), a plug-in, and/or a process.

In some examples, the systems described herein may determine that the executable object is not authorized to access the persistent storage object by: 1) accessing or identifying a whitelist for authorizing access to the persistent storage object and then 2) determining that the whitelist does not include the executable object. Such a whitelist may include trusted executable objects and/or executable objects likely to have a legitimate reason for accessing the persistent storage object. For example, the whitelist may include the Internet client application, a web browser, a web browser plug-in, a security application, a backup application, and/or a utility application.

In some examples, the executable object may include a plug-in. In these examples, the various systems described herein may identify an attempt by the executable object to access the persistent storage object by: 1) identifying an attempt by a web browser to access the persistent storage object and then 2) determining that the web browser attempted to access the persistent storage object on behalf of a plug-in. In some examples, the systems described herein may determine whether a web browser is attempting to access the persistent storage object on behalf of a plug-in by analyzing the web browser's execution stack (to identify, for example, a component of the web browser that originated the attempt). As used herein, the term "plug-in" may refer to any plug-in, add-on, extension, library, and/or module. Examples of plug-ins include XPCOM components for MOZILLA FIREFOX and Browser Helper Objects for MICROSOFT INTERNET EXPLORER.

In some examples, the security action may include blocking the attempt to access the persistent storage object. Additionally or alternatively, the security action may include flagging the executable object as potentially malicious, quarantining the executable object, and/or removing the executable object.

As will be explained below, by blocking unauthorized attempts to access persistent storage objects, the systems and methods described herein may prevent malware (such as worms) from exploiting session information and/or any other sensitive information stored in persistent storage objects in order to spread or cause other undesired effects. As such, the systems and methods described herein may, for example, prevent malware from posting fraudulent messages, malicious links, and/or any other unauthorized messages (such as spam) to, and/or placing fraudulent orders via, social networking sites, web forums, wiki sites, e-commerce websites, or the like. Accordingly, the systems and methods described herein may provide zero-day protection against malware that exploits persistent storage objects by not relying on more traditional signature-based detection methods.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
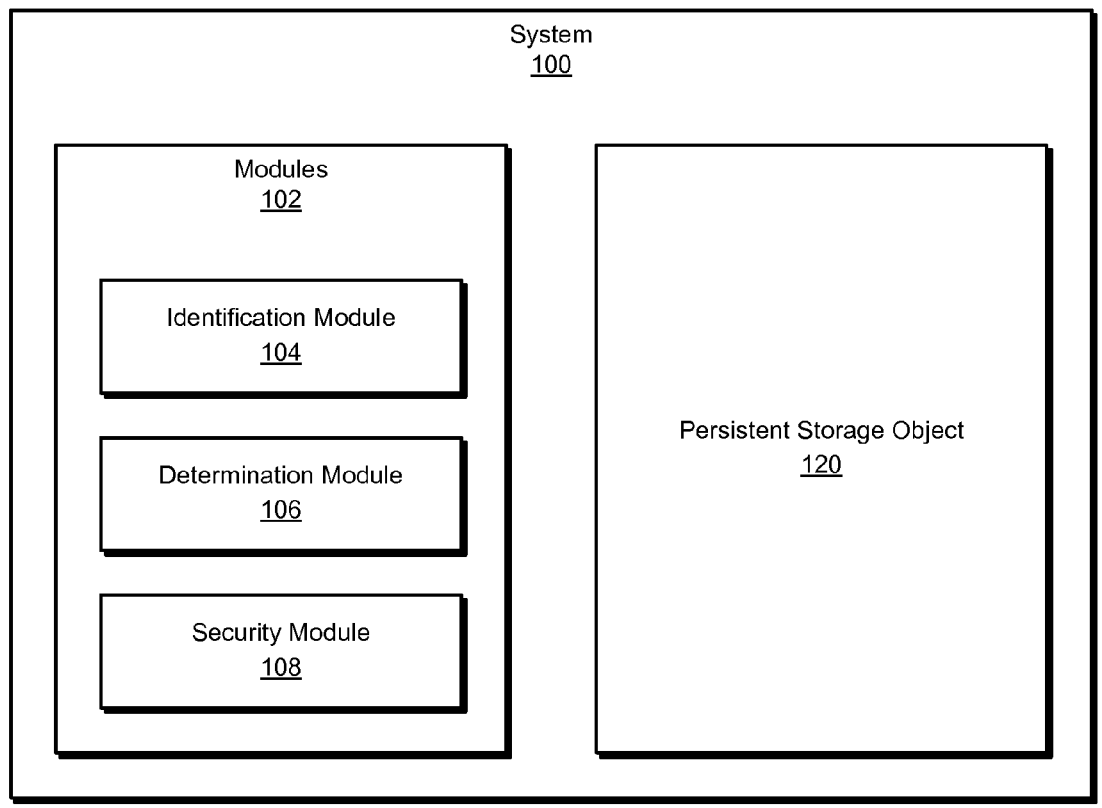
FIG. 1 is a block diagram of an exemplary system for blocking and removing Internet-traversing malware.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for blocking and removing Internet-traversing malware. In one example, the various systems described herein may accomplish this task by: 1) identifying a persistent storage object of an Internet client application, 2) identifying an attempt by an executable object to access the persistent storage object, 3) determining that the executable object is not authorized to access the persistent storage object, and then 4) performing a security action based on the determination.

Figure 2:
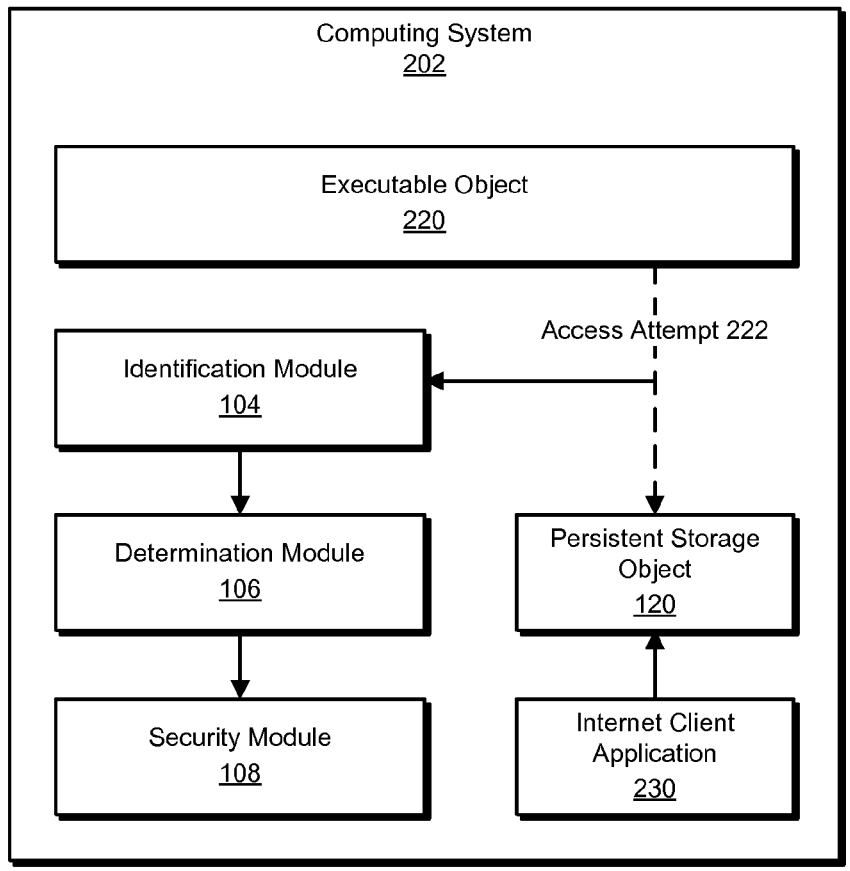
FIG. 2 is a block diagram of an exemplary system for blocking and removing Internet-traversing malware.

The following will provide, with reference to FIGS. 1-2, detailed descriptions of exemplary systems for blocking and removing Internet-traversing malware. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for blocking and removing Internet-traversing malware. As illustrated in this figure, exemplary system 100 may include one or more modules 102 for performing one or more tasks. For example, and as will be explained in greater detail below, exemplary system 100 may include an identification module 104 programmed to identify an attempt by an executable object to access the persistent storage object. Exemplary system 100 may also include a determination module 106 programmed to determine that the executable object is not authorized to access the persistent storage object.

In addition, and as will be described in greater detail below, exemplary system 100 may include a security module 108 programmed to perform a security action based on the determination. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include a persistent storage object 120. Persistent storage object 120 may represent portions of a single computing system or a plurality of computing systems. For example, persistent storage object 120 may represent a portion of computing system 202 in FIG. 2, computing system 410 in FIG. 4, and/or portions of exemplary network architecture 500 in FIG. 5.

In some examples, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Exemplary system 100 in FIG. 1 may be deployed in a variety of ways. For example, all or a portion of exemplary system 100 may represent portions of an exemplary system 200 in FIG. 2. As shown in FIG. 2, system 200 may include a computing system 202. In one embodiment, and as will be described in greater detail below, modules 102 from FIG. 1 may cause computing system 202 to: 1) identify a persistent storage object (such as persistent storage object 120) of an Internet client application (such as Internet client application 230), 2) identify an attempt (such as an access attempt 222) by an executable object (such as executable object 220) to access the persistent storage object, 3) determine that the executable object is not authorized to access the persistent storage object, and then 4) perform a security action based on the determination (by, e.g., blocking the access attempt and/or removing the executable object).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 410 in FIG. 4, or any other suitable computing device.

Figure 3:
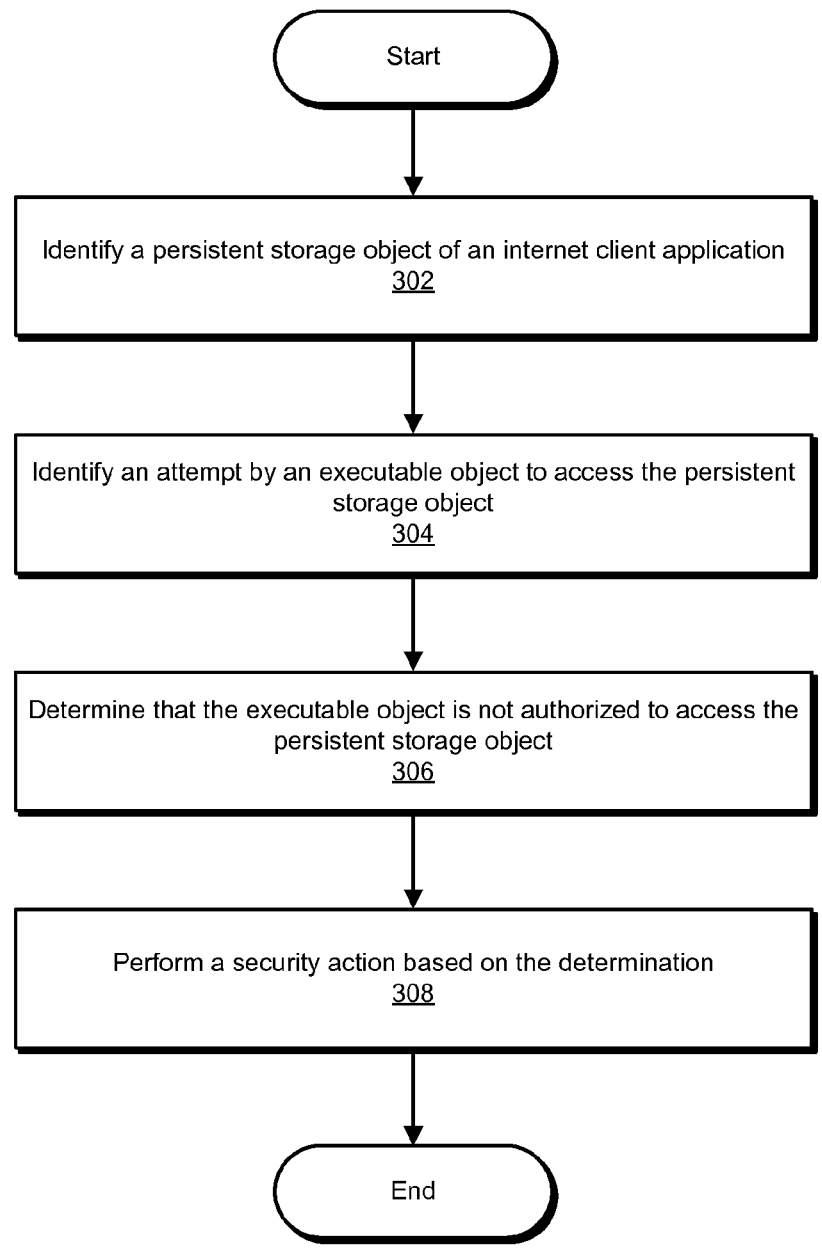
FIG. 3 is a flow diagram of an exemplary method for blocking and removing Internet-traversing malware.

FIG. 3 is a flow diagram of an exemplary computer-implemented method 300 for blocking and removing Internet-traversing malware. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a persistent storage object of an Internet client application. For example, at step 302 identification module 104 may, as part of computing system 202 in FIG. 2, identify persistent storage object 120 of Internet client application 230.

As used herein, the term "Internet client application" may refer to any application and/or system configured to provide access to a network by implementing one or more application-layer protocols. For example, an Internet client application may refer to a web browser, an instant messenger, email client, or any other client application that may create, manage, and/or store a persistent storage object.

In addition, the term "persistent storage object" may refer to any object created, managed, and/or stored by an Internet client application that may be accessed by third-party programs (such as malware) and which may contain information that malware may exploit. In one example, a persistent storage object may refer to a cookie. A persistent storage object may persist across client sessions (e.g., after a web browser is closed and re-opened) or merely within sessions (e.g., while a web browser remains open).

Identification module 104 may perform step 302 in any suitable manner. For example, identification module 104 may identify the persistent storage object of the Internet client application by reading from a configuration file that identifies the location of the persistent storage object. Additionally or alternatively, identification module 104 may identify the persistent storage object of the Internet client application by identifying the Internet client application and determining where the Internet client application stores persistent storage objects. In some examples, and as will be described in greater detail below, identification module 104 may identify the persistent storage object during an attempt to access the persistent storage object.

Returning to FIG. 3, at step 304 one or more of the systems described herein may identify an attempt by an executable object to access the persistent storage object. For example, at step 304 identification module 104 may, as part of computing system 202 in FIG. 2, identify access attempt 222 by executable object 220 to access persistent storage object 120. As used herein, the term "executable object" may refer to any collection of executable instructions. For example, an executable object may include all or portions of an application, a library (such as a dynamic-link library), a plug-in, and/or a process.

Identification module 104 may identify an attempt to access the persistent storage object in a variety of contexts. For example, identification module 104 may intercept attempts to access the persistent storage object (e.g., as part of a file system driver). In some examples, identification module 104 may be configured to monitor certain directories, folders, and/or files, such as the "Temporary Internet Files" folder used by MICROSOFT INTERNET EXPLORER and/or the "cookies.txt" file used by MOZILLA FIREFOX.

Identification module 104 may attribute the access attempt identified in step 304 to an executable object in a variety of ways. For example, identification module 104 may determine that an executable object is associated with a particular access attempt if the executable object was directly responsible for the access attempt (e.g., if the executable object was the last in a chain of executable objects to execute instructions to attempt to access the persistent storage object). Additionally or alternatively, identification module 104 may determine that an executable object is associated with a particular access attempt if the executable object was a parent process of a process that made the access attempt.

In some examples, identification module 104 may determine that an executable object is associated with a particular access attempt if the executable object was responsible for initiating the attempt. For example, identification module 104 may: 1) identify an attempt by a web browser to access a persistent storage object and then 2) determine that the web browser attempted to access the persistent storage object on behalf of a plug-in. In this example, identification module 104 may attribute the attempt to the plug-in.

Identification module 104 may determine that a web browser attempted to access a persistent storage object on behalf of a plug-in in any suitable manner. For example, identification module 104 may analyze a web browser's execution stack in order to trace the origin of a call to access the persistent storage object. In doing so, identification module 104 may determine that a plug-in of the web browser initiated the attempt to access the persistent storage object. In this example, the systems described herein may perform subsequent steps (such as determining whether the access attempt was legitimate and/or performing various security actions in order to prevent unauthorized access) with reference to the plug-in instead of the web browser.

Returning to FIG. 3, at step 306 one or more of the systems described herein may determine that the executable object is not authorized to access the persistent storage object. For example, at step 306 determination module 106 may, as part of computing system 202 in FIG. 2, determine that executable object 220 is not authorized to access persistent storage object 120.

Determination module 106 may perform step 306 in a variety of ways. In one example, determination module 106 may determine that the executable object is not authorized to access the persistent storage object by: 1) accessing and/or identifying a whitelist for authorizing access to the persistent storage object and then 2) determining that the whitelist does not include the executable object. In some examples, this whitelist may include any application and/or process that may have a legitimate purpose for accessing the persistent storage object. For example, the whitelist may include the Internet client application, a web browser, and/or web browser plug-ins. Additionally or alternatively, the whitelist may include system and/or utility processes and/or applications, such as security applications (e.g., anti-virus programs), backup applications, defragmentation applications, indexing applications, or the like.

In some examples, determination module 106 may determine that the executable object is not authorized to access the persistent storage object as part of a more complex behavioral analysis. For example, determination module 106 may generate a score relating to the likelihood that the access attempt was illegitimate. In this example, determination module 106 may incorporate a number of factors when generating this score, including characteristics of the executable object (such as installation time, associated file types, other activity by the executable object, etc.) as well as characteristics of the access attempt itself.

In the above example, if determination module 106 determines that the score exceeds a predetermined threshold, determination module 106 may determine that the executable object is not authorized to access the persistent storage object. In some embodiments, determination module 106 may also consider other information when attempting to determine the legitimacy of an access attempt, such as subsequent activity by the executable object (e.g., if the executable object attempts to transmit a session identifier that was stored in the persistent storage object across a network).

Returning to FIG. 3, at step 308 one or more of the systems described herein may perform a security action based on the determination made in step 306. For example, if determination module 106 in FIG. 2 determines that executable object 220 is not authorized to access persistent storage object 120 in step 306, then at step 308 security module 108 may, as part of computing system 202, prevent executable object 220 from accessing persistent storage object 120.

Examples of security actions that security module 108 may perform in step 308 include, without limitation, blocking the access attempt (if, for example, identification module 104 intercepted the access attempt), flagging the executable object as potentially malicious, quarantining the executable object, removing the executable object, disabling a plug-in (if the executable object is a plug-in), and/or notifying a user and/or administrator of the unauthorized access attempt.

In some examples, security module 108 may also transmit the executable object to a security vendor for analysis (in order to, e.g., identify and remove the executable object and/or malware within the executable object from other computing systems). In some examples, security module 108 may also change and/or recommend changes to security settings of the Internet client application. For example, security module 108 may disable cookies within a web browser or set cookies to expire at the end of each browser session.

As detailed above, by blocking unauthorized attempts to access persistent storage objects, the systems and methods described herein may prevent malware (such as worms) from exploiting session information and/or any other sensitive information stored in persistent storage objects in order to spread or cause other undesired effects. As such, the systems and methods described herein may, for example, prevent malware from posting fraudulent messages, malicious links, and/or any other unauthorized messages (such as spam) to, and/or placing fraudulent orders via, social networking sites, web forums, wiki sites, e-commerce websites, or the like. Accordingly, the systems and methods described herein may provide zero-day protection against malware that exploits persistent storage objects by not relying on more traditional signature-based detection methods.

Figure 4:
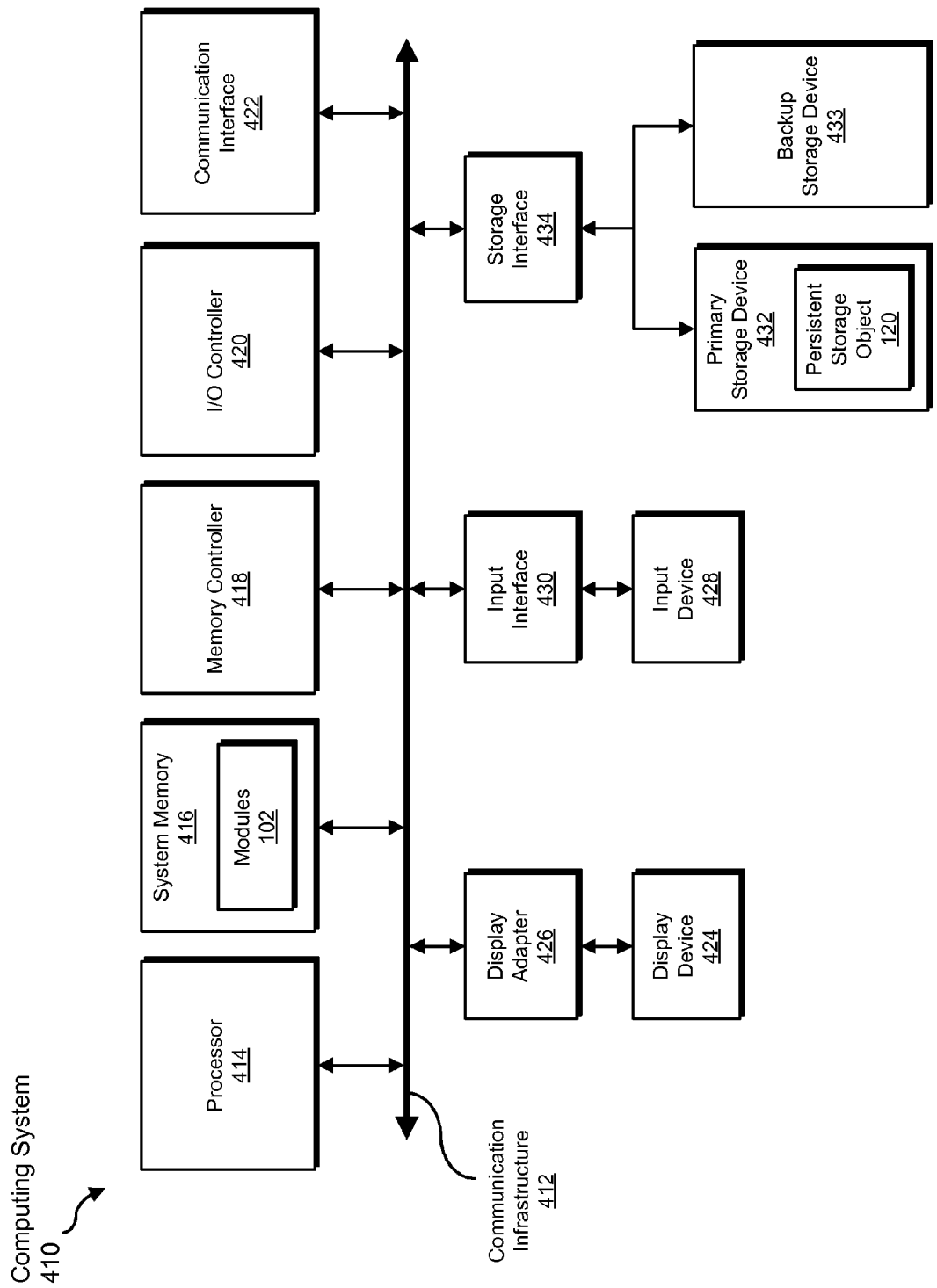
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the identifying, determining, analyzing, performing, blocking, flagging, quarantining, and/or removing steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an input/output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the steps or features described and/or illustrated herein, such as identifying, determining, analyzing, performing, blocking, flagging, quarantining, and/or removing.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the identifying, determining, analyzing, performing, blocking, flagging, quarantining, and/or removing steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the identifying, determining, analyzing, performing, blocking, flagging, quarantining, and/or removing steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the identifying, determining, analyzing, performing, blocking, flagging, quarantining, and/or removing steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. In one example, persistent storage object 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the identifying, determining, analyzing, performing, blocking, flagging, quarantining, and/or removing steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
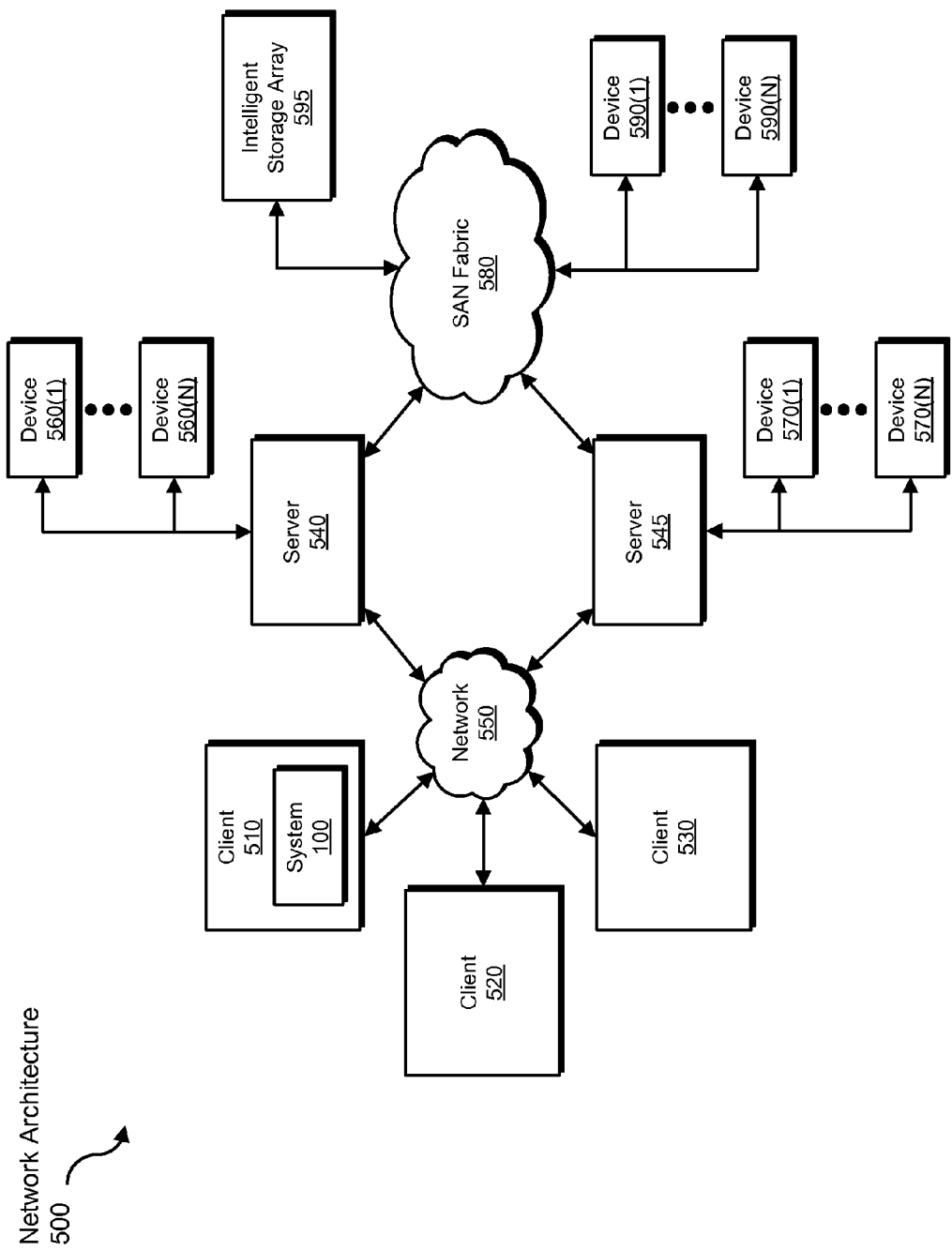
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the identifying, determining, analyzing, performing, blocking, flagging, quarantining, and/or removing steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for blocking and removing Internet-traversing malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more modules described herein may transform a computing system vulnerable to social networking worms into a computing system secured from social networking worms. As another example, one or more modules described herein may transform a computing system infected with a social networking worm into a computing system free from the social networking worm.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for blocking and removing Internet-traversing malware, the method comprising:

identifying, at a computing device of a user that comprises at least one processor, a cookie file that was created by a web browser installed on the computing device and that contains session information that is used to access an account of the user;

identifying, at the computing device, an attempt by the web browser executing on the computing device to access the cookie file;

determining that the web browser is attempting to access the cookie file on behalf of an executable object;

determining, at the computing device, that the executable object is not authorized to access the cookie file by:

generating a score based at least in part on at least one of:

multiple characteristics of the executable object that indicate that the executable object's attempt to access the cookie file is unauthorized;

multiple characteristics of the web browser's attempt to access the cookie file that indicate that the executable object's attempt to access the cookie file is unauthorized;

determining that the score exceeds a predetermined threshold; and in response to determining that the executable object is not authorized to access the cookie file, blocking the attempt by the web browser to access the cookie file.

2. The computer-implemented method of claim 1, wherein blocking the attempt by the web browser to access the cookie file comprises changing security settings of the web browser to block the web browser from accessing the cookie file.

3. The computer-implemented method of claim 2, wherein changing the security settings of the web browser to block the web browser from accessing the cookie file comprises at least one of:

preventing the web browser from using cookies;
preventing the web browser from using cookie files.

4. The computer-implemented method of claim 1, wherein the executable object comprises at least a portion of at least one of:

an application;
a library;
a plug-in;
a process.

5. The computer-implemented method of claim 1, wherein identifying the attempt by the web browser to access the cookie file comprises intercepting an attempt by the web browser to access the cookie file via a file system of the computing device.

6. The computer-implemented method of claim 1, wherein determining that the web browser is attempting to access the cookie file on behalf of the executable object comprises analyzing an execution stack of the web browser.

7. The computer-implemented method of claim 1, further comprising at least one of:

flagging the executable object as potentially malicious;
quarantining the executable object;
removing the executable object.

8. The computer-implemented method of claim 1, wherein the executable object is a web-browser plug-in and the method further comprises disabling the web-browser plug-in.

9. The computer-implemented method of claim 1, wherein identifying the cookie file comprises monitoring a storage location on the computing device that contains cookie files generated by the web browser.

10. The computer-implemented method of claim 1, wherein identifying the attempt by the web browser to access the cookie file comprises at least one of:

determining that the executable object is directly responsible for initiating the attempt to access the cookie file;
determining that the executable object comprises a parent process of a process that initiated the attempt to access the cookie file;
determining that the executable object was the last in a chain of applications to execute instructions that initiated the attempt to access the cookie file.

11. A system for blocking and removing Internet-traversing malware, the system comprising:

at least one hardware processor programmed to:
identify a cookie file that was created by a web browser installed on the system and that contains session information that is used to access an account of a user;
identify an attempt by the web browser executing on the system to access the cookie file;
determine that the web browser is attempting to access the cookie file on behalf of an executable object;
determine that the executable object is not authorized to access the cookie file by:
generating a score based at least in part on at least one of:
multiple characteristics of the executable object that indicate that the executable object's attempt to access the cookie file is unauthorized;
multiple characteristics of the web browser's attempt to access the cookie file that indicate that the executable object's attempt to access the cookie file is unauthorized;
determining that the score exceeds a predetermined threshold; and
in response to determining that the executable object is not authorized to access the cookie file, block the attempt by the web browser to access the cookie file.

12. The system of claim 11, wherein the hardware processor is programmed to block the attempt by the web browser to access the cookie file by changing security settings of the web browser to block the web browser from accessing the cookie file.

13. The system of claim 12, wherein the hardware processor is programmed to change the security settings of the web browser to block the web browser from accessing the cookie file by at least one of:

preventing the web browser from using cookies;
preventing the web browser from using cookie files.

14. The system of claim 11, wherein the executable object comprises at least a portion of at least one of:

an application;
a library;
a plug-in;
a process.

15. The system of claim 11, wherein the hardware processor is programmed to identify the attempt by the web browser to access the cookie file by intercepting an attempt by the web browser to access the cookie file via a file system of the system.

16. The system of claim 11, wherein the hardware processor is programmed to determine that the web browser is attempting to access the cookie file on behalf of the executable object by analyzing an execution stack of the web browser.

17. A non-transitory computer-readable-storage medium comprising one or more computer-executable instructions that, when executed by at least one processor of a computing device, cause the computing device to:

identify a cookie file that was created by a web browser installed on the computing device and that contains session information that is used to access an account of a user;
identify an attempt by the web browser executing on the computing device to access the cookie file;
determine that the web browser is attempting to access the cookie file on behalf of an executable object;
determine that the executable object is not authorized to access the cookie file by:
generating a score based at least in part on at least one of:
multiple characteristics of the executable object that indicate that the executable object's attempt to access the cookie file is unauthorized;
multiple characteristics of the web browser's attempt to access the cookie file that indicate that the executable object's attempt to access the cookie file is unauthorized;

determining that the score exceeds a predetermined threshold; and in response to determining that the executable object is not authorized to access the cookie file, block the attempt by the web browser to access the cookie file.

* * * * *